(12) United States Patent
Colas et al.

(10) Patent No.: US 11,410,380 B2
(45) Date of Patent: Aug. 9, 2022

(54) METHODS FOR LOCALIZING A DIGITALLY-MODELED OBJECT WITH RESPECT TO A DIGITALLY-MODELED SPACE AND FOR PERFORMING VOLUMETRIC QUERIES

(71) Applicant: DASSAULT SYSTEMES, Velizy Villacoublay (FR)

(72) Inventors: Thibaud Colas, Velizy Villacoublay (FR); Xavier Gourdon, Paris (FR); Pierre-Yves Bisson, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 17/095,266

(22) Filed: Nov. 11, 2020

(65) Prior Publication Data
US 2021/0150808 A1 May 20, 2021

(30) Foreign Application Priority Data
Nov. 18, 2019 (EP) .................................... 19306478

(51) Int. Cl.
*G06T 17/00* (2006.01)
(52) U.S. Cl.
CPC ................... *G06T 17/005* (2013.01)
(58) Field of Classification Search
None
See application file for complete search history.

(56) References Cited

U.S. PATENT DOCUMENTS

| 2011/0202492 A1* | 8/2011 | Salemann | G06F 16/29 706/50 |
| 2017/0178388 A1* | 6/2017 | Bisson | G06T 17/00 |
| 2019/0205483 A1* | 7/2019 | De Pena | G06F 30/00 |
| 2020/0334839 A1* | 10/2020 | Frommert | G06T 7/0012 |

OTHER PUBLICATIONS

Hauth, Steffen, Yavuz Murtezaoglu, and Lars Linsen. "Extended linked voxel structure for point-to-mesh distance computation and its application to NC collision detection." Computer-Aided Design 41.12 (2009): 896-906. (Year: 2009).*
Pang, Yueyong, et al. "Extracting indoor space information in complex building environments." ISPRS International Journal of Geo-Information 7.8 (2018): 321. (Year: 2018).*

(Continued)

*Primary Examiner* — Nurun Flora
(74) *Attorney, Agent, or Firm* — Oblon, McClelland, Maier & Neustadt, L.L.P.

(57) ABSTRACT

A computer-implemented method and system for determining a localization of a digitally-modeled object with respect to a digitally-modeled space and performing volumetric queries. The method including retrieving or creating voxel representations of the object (OV) and of the space, partitioning these representations of the digitally-modeled object into sets of heart (OH) and border (OB) voxels, determining intersections between sets of voxels of the object and of the space, and based on said intersections, determining the localization of the digitally-modeled object with respect to the digitally-modeled space.

17 Claims, 6 Drawing Sheets

(56) References Cited

OTHER PUBLICATIONS

Xiong, Qing, et al. "Free multi-floor indoor space extraction from complex 3D building models." Earth Science Informatics 10.1 (2017): 69-83. (Year: 2017).*
Extended Search Report in Europe Patent Application No. 19306478.9-1230; 9 pgs.
Nobuhiro Kimura, et al.; "A Fast Collision Check Algorithm EDGE for Moving 3-D Objects"; Proceedings. 2000 IEEE/RSJ International Conference On Intelligent Robots and Systems (IROS 2000); Oct. 31-Nov. 5, 2000; Takamatsu, Japan, IEEE, Piscataway, NJ, USA; vol. 3, Oct. 31, 2000; XP032883389; ISBN: 978-0-7803-6348-9; (8 pages).
P. Jimenez, et al.; "3D Collision Detection: A Survey"; Computers and Graphics, Elsevier, GB: vol. 25, No. 2; Apr. 2001; XP004232467; ISSN: 0097-8493; (30 pages).

* cited by examiner

| case | OH∩SH | OH∩SB | OH∩SO | OH$_{in}$ | OH$_{in/out}$ | OH$_{out}$ |
|---|---|---|---|---|---|---|
| H000 | 0 | 0 | 0 | No | No | No |
| H100 | 1 | 0 | 0 | Yes | No | No |
| H010 | 0 | 1 | 0 | Maybe | Maybe | Maybe |
| H001 | 0 | 0 | 1 | No | No | Yes |
| H110 | 1 | 1 | 0 | Maybe | Maybe | No |
| H011 | 0 | 1 | 1 | No | Maybe | Maybe |
| H101 | 1 | 0 | 1 | No | Yes | No |
| H111 | 1 | 1 | 1 | No | Yes | No |

| case | OB∩SH | OB∩SB | OB∩SO | OB$_{in}$ | OB$_{in/out}$ | OB$_{out}$ |
|---|---|---|---|---|---|---|
| B000 | 0 | 0 | 0 | No | No | No |
| B100 | 1 | 0 | 0 | Yes | No | No |
| B010 | 0 | 1 | 0 | Maybe | Maybe | Maybe |
| B001 | 0 | 0 | 1 | No | No | Yes |
| B110 | 1 | 1 | 0 | Maybe | Maybe | Maybe |
| B011 | 0 | 1 | 1 | Maybe | Maybe | Maybe |
| B101 | 1 | 0 | 1 | No | Yes | No |
| B111 | 1 | 1 | 1 | Maybe | Maybe | Maybe |

Fig. 3C

METHODS FOR LOCALIZING A DIGITALLY-MODELED OBJECT WITH RESPECT TO A DIGITALLY-MODELED SPACE AND FOR PERFORMING VOLUMETRIC QUERIES

CROSS-REFERENCE TO RELATED APPLICATIONS

This application claims priority under 35 U.S.C. § 119 or 365 to European Application No. 19306478.9, filed Nov. 18, 2019. The entire contents of the above application(s) are incorporated by reference.

FIELD

The disclosure relates to a computer-implemented method of determining a localization of a digitally-modeled object with respect to a digitally-modeled space, and for performing volumetric queries. It pertains to the field of computer-aided engineering.

BACKGROUND

Digital mockups, describing in three-dimensions (3D) a product with great detail, have become essential in many industries, such a mechanical engineering, shipbuilding, construction, etc.

They allow reducing time-to-market and product development costs by identifying potential issues earlier in the design process and replacing physical prototypes. Moreover, they allow exploring a greater number of design alternatives before choosing a final one.

The digital mockup of a large system such as a ship, aircraft or industrial plants may comprise millions of 3D objects representing components, amounting to huge data volumes, which are difficult to handle.

Such large systems are usually broken down into zones. For instance, ships require to be partitioned into Fire Zones, Watertight Compartments, and Watertight decks in order to ensure Safety of Life at Sea regulations; nuclear plants are partitioned into different Zones, corresponding to different levels of safety and radiation hazards; buildings are made of floors, and further broken down into Fire Zones as well, to prevent fire propagation, etc. This decomposition into zones is reproduced by the digital mockup.

It is often necessary to identify which 3D objects of a digital mockup are located into a specific 3D zone (volumetric query), and conversely which zone(s) contain(s) a specific object. This allows, for instance:

Computing Key Product Performance Indicators, such as weight, volume, etc.

Traceability and checking design consistency, conformity to regulation, custom requirements. For instance, in a ship, it may be necessary to check that there is be a pump in every watertight compartment, a fire detector in public rooms, etc.

3D objects and zones (or spaces) are usually represented in a format which accurately accounts for their geometry, such as a tessellated format, i.e. a solid part is represented by a three-dimensional surface formed by polygons, often triangles. Directly performing volumetric queries using such format would require too much memory space and processing power, particularly taking into account that the number of object may be up to several millions sometimes even tens of millions. Therefore, prior to performing volumetric queries it is usual to convert them to a voxel-based format, preferably an n-tree voxel format and even more preferable an octree (n-tree for n=3) voxel format. This is known (albeit in a different context) from U.S. Pat. No. 8,013,854.

The octree voxel representation of an object or space is based on a cube which encompasses the object/space (note that a space can be considered a particular kind of object). This cube is then split into eight octants (smaller cubes), arranged in a 2×2×2 three-dimensional array; more generally, in an arbitrary n-tree representation, the volume is split into $2^n$ smaller volumes. The cubes which contain part of the object are split again; those which do not contain part of the geometry are not split. The process is carried out recursively, over a predetermined number of recursion (e.g. 10). At the end of the process, the cubes form an approximated representation of the product part, having a significantly smaller memory occupation than one based on uniform voxels. Moreover, the representation is conveniently stored in a tree-based data structure. The computation of the voxel-based representation is generally performed offline, before that a query is entered by a user.

FIG. 1A shows a tessellated representation (in 2D, for the sake of simplicity) of a digitally-modeled space S and of three digitally-modeled objects $O_1$, $O_2$ and $O_3$. Object $O_1$ is fully inside space S; object $O_3$ is fully outside and object $O_2$ is partly inside and partly outside the space, and more particularly across its boundary (note that a non-connected objects, formed by several disjoint parts, may be "partly inside and partly outside" without being "across").

FIG. 1B shows a "voxel-based" representation (although the term voxel is improper here, as the representation is two-dimensional) of the same space and objects. Reference SV denotes the voxel-based representation of the space, $OV_1$, $OV_2$ and $OV_3$ represent (very simplified, for the sake of clarity of the representation) voxel-based representations of the objects. All the voxels of $OV_1$ (actually, there is only one of them) intersect the voxels of SV, and none of them intersects the outer space SO (which may itself be decomposed into voxels, or not); this allows determining that $OV_1$ is "fully inside" SV. All the voxels of $OV_3$ (actually, there is only one of them) intersect the outer space SO, and none of them intersects SV; this allows determining that $OV_3$ is "fully outside" SV. Finally, some voxels of $OV_2$ intersect SV and some intersect SO (in this specific example, $OV_2$ consist of a single voxel intersecting both SV and SO); this allows determining that $OV_1$ is "partly inside and partly outside" SV.

This approach, however, is prone to errors—particularly concerning objects situated near the boundaries of the space—due to the use of approximate (voxel-based) representations of the geometries. This is illustrated on FIG. 1C where both "voxel-modeled" objects $OV_4$ and $OV_5$ are found to be party inside and partly outside the space SV, even if a tessellated representation shows that the two objects are in fact fully inside and fully outside the space, respectively. Indeed, the voxel-based representations of both the space and the object extend beyond the corresponding tessellated representations (i.e. constitute upper bounds of the space and of the object, respectively), resulting in spurious intersections. The consequence is that if a query for "fully-in" objects is performed, it will miss $OV_4$, while if the query is extended to "partly-in" objects, it will include $OV_5$. This is particularly problematic due to the fact that, in many case, several important objects are situated near the borders of a space. For instance, in buildings and ships, fire extinguishers and smoke detectors are usually affixed to the walls or ceilings of the rooms. Therefore, it is possible for e.g. a fire extinguisher to be detected in a room while it is situated in an adjacent space, or conversely to be missed.

Improving the spatial resolution of the voxel representations may mitigate this problem, but at a high cost in terms of computing resources, and it will not solve it in all cases.

SUMMARY

The disclosure aims at overcoming these drawbacks of the background art with minimal additional complexity.

One embodiment includes a computer-implemented method of determining a localization of a digitally-modeled object with respect to a digitally-modeled space, comprising the steps of:
- a) retrieving or creating voxel representations of the digitally-modeled object and of the digitally-modeled space;
- b) partitioning the voxel representation of the digitally-modeled object into a first set of heart object voxels and a second set of border object voxels, and partitioning the voxel representation of the digitally-modeled space into a third set of heart space voxels and a fourth set of border space voxels;
- c) assessing whether:
  - the second set of border object voxels intersects the third set of heart space voxels;
  - the second set of border object voxels intersects the fourth set of border space voxels; and
  - the second set of border object voxels extends outside the digitally-modeled space;
- d) based on the results of said assessing, determining the localization of the digitally-modeled object with respect to the digitally-modeled space.

According to particular embodiments of the method:
Step c) may further comprise assessing whether:
  the first set of heart object voxels intersects the third set of heart space voxels;
  the first set of heart object voxels intersects the fourth set of border space voxels; and
  the first set of heart object voxels extends outside the digitally-modeled space.
Step d) may comprise:
  ad-1) evaluating a first three-valued logic function of the results of said assessing, representing whether the digitally-modeled object is to fully inside the digitally-modeled space;
  d-2) evaluating a second three-valued logic function of the results of said assessing, representing whether the digitally-modeled object is situated across the border of the digitally-modeled space; and
  d-3) evaluating a third three-valued logic function of the results of said assessing, representing whether the digitally-modeled object is fully outside the digitally-modeled space;
  wherein each of said three-valued logic functions take a 'true' value, a 'false' value or an 'indeterminate' value.
More particularly, step d) may further comprise assigning the object to one of a plurality of classes depending on the values of said three-valued logic functions.
Even more particularly, said classes may comprise:
  a first class of digitally-modeled objects for which the first three-valued logic function takes a 'true' value, and the second and third three-valued logic functions take a 'false' value;
  a second class of digitally-modeled objects for which the first and the second three-valued logic functions take an 'indeterminate' value and the third three-valued logic function takes a 'false' value;
  a third class of digitally-modeled objects for which the first and the third three-valued logic functions take a 'false' value and the second three-valued logic function takes a 'true' value;
  a fourth class of digitally-modeled objects for which the first three-valued logic function takes a 'false' value and the second and the third three-valued logic functions takes an 'indeterminate' value;
  a fifth class of digitally-modeled objects for which the first and the second three-valued logic functions take a 'false' value and the third three-valued logic function takes a 'true' value; and
  a sixth class of digitally-modeled objects for which the three three-valued logic functions all take an indeterminate value.

Said voxel representations may be n-tree, and preferably octree, voxel representations.

Step a) may comprise creating the voxel representation of at least one of the digitally-modeled object and digitally-modeled space from a different representation thereof.

Another object is a computer-implemented method of performing a volumetric query, comprising:
A first phase, comprising the steps of:
  i) retrieving or creating voxel representations of a plurality of digitally-modeled objects and of one or more digitally-modeled space;
  ii) partitioning the voxel representation of each digitally-modeled objects into a first set of heart object voxels and a second set of border object voxels, and partitioning the voxel representation of each or said digitally-modeled space into a third set of heart space voxels and a fourth set of border space voxels;
A second phase, comprising the steps of:
  iii) receiving a request from the user, the request comprising an indication of said or one digitally-modeled space and an indication of a required relationship between the digitally-modeled space and objects to be retrieved;
  iv) For each of said digitally-modeled object assessing whether:
    the second subset of border object voxels intersects the third set of heart space voxels;
    the second subset of border object voxels intersects the fourth set of border space voxels;
  v) For each of said digitally-modeled object determining, based on the results of said assessing, if it matches the required spatial relationship with the digitally-modeled space; and
  vi) Retrieving the digitally-modeled objects matching the required spatial relationship with the digitally-modeled space.

According to particular embodiments of such a method:
Step iv) may further comprise assessing whether:
  the first subset of heart object voxels intersects the third set of heart space voxels;
  the first subset of heart object voxels intersects the fourth set of border space voxels; and
  the first subset of heart object voxels extends outside the digitally-modeled space.
Step v) may comprise, for each of said digitally-modeled object:
  v-1) evaluating a first three-valued logic function of the results of said assessing, representing whether the digitally-modeled object is at least partially inside the digitally-modeled space;

v-2) evaluating a second three-valued logic function of the results of said assessing, representing whether the digitally-modeled object is at least partially situated across the border of the digitally-modeled space; and v-3) evaluating a third three-valued logic function of the results of said assessing, representing whether the digitally-modeled object is at least partially outside the digitally-modeled space;

wherein each of said three-valued logic functions take a 'true' value, a 'false' value or an 'indeterminate' value.

More particularly, the required spatial relationship between the digitally-modeled space and objects to be retrieved may be chosen among the following:

digitally-modeled objects which are certainly fully inside the digitally-modeled space;

digitally-modeled objects which are certainly at least partly inside the digitally-modeled space;

digitally-modeled objects which are certainly across the border of the digitally-modeled space;

digitally-modeled objects which are certainly at least partly outside the digitally-modeled space;

digitally-modeled objects which are certainly fully outside the digitally-modeled space;

digitally-modeled objects whose relationship with the digitally-modeled space in undetermined.

Even more particularly, in step v):

objects for which the first three-valued logic function takes a 'true' value, and the second and third three-valued logic functions take a 'false' value may be considered to be certainly fully inside the space;

objects for which the first and the second three-valued logic functions take an 'indeterminate' value and the third three-valued logic function takes a 'false' value, as well as objects for which the first three-valued logic function takes a 'true' value, and the second and third three-valued logic functions take a 'false' value may be considered to be certainly fully inside the space, are considered to be certainly at least partly inside the space;

objects for which the first and the third three-valued logic functions take a 'false' value and the second three-valued logic function takes a 'true' value may be considered to be certainly across the border of the space;

objects for which the first and the second three-valued logic functions take a 'false' value and the third three-valued logic function takes a 'true' value may be considered to be certainly fully outside the space;

objects for which the first three-valued logic function takes a 'false' value and the second and the third three-valued logic functions takes an 'indeterminate' value, as well as objects for which the first and the second three-valued logic functions take a 'false' value and the third three-valued logic function takes a 'true' value, are considered to be certainly at least partly outside the space; and objects for which the three three-valued logic functions all take a false value are considered to have an undetermined relationship with the space.

Said voxel representations may be n-tree, and preferably octree, voxel representations.

Step i) may comprise creating the voxel representation of at least one of the digitally-modeled object and digitally-modeled space from a different representation thereof.

Yet another embodiment is a computer program product, stored on a non-transitory computer-readable data-storage medium, comprising computer-executable instructions to cause a computer system to carry out a method according to any of the preceding claims.

A further embodiment is a non-transitory computer-readable data-storage medium containing computer-executable instructions to cause a computer system to carry out such a method.

An additional embodiment is a computer system comprising a processor coupled to a non-transitory memory and a graphical user interface, the non-transitory memory storing computer-executable instructions to cause the computer system to carry out such a method.

BRIEF DESCRIPTION OF THE DRAWINGS

Additional features and advantages of the disclosure will become apparent from the subsequent description, taken in conjunction with the accompanying drawings, wherein:

FIGS. 2A and 2B illustrate an aspect, namely the distinction between "heart" and "border" voxels for both the objects and the space;

FIGS. 3A, 3B and 3C are tables illustrating how objects are classified, based on their relationship with a space, according to an embodiment;

DETAILED DESCRIPTION

Figure 1A:
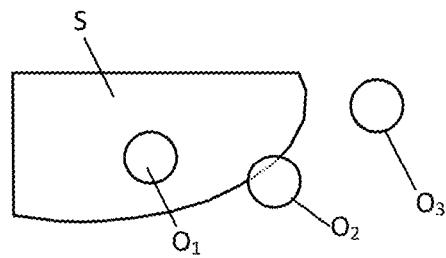
FIGS. 1A, 1B and 1C, already described, illustrate a method according to the prior art, FIG. 1C illustrating a limitation of such a method which is overcome by the present disclosure.
Figure 1B:
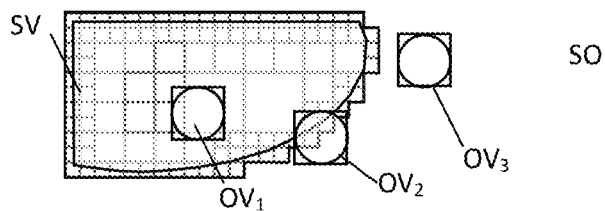
Figure 1C:
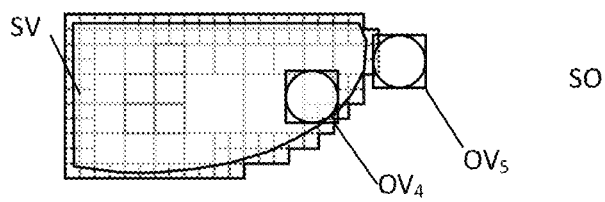
Figure 2A:
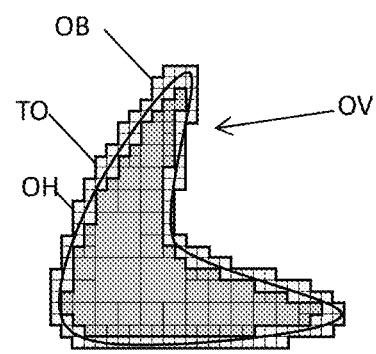
Figures 2B, 3A, 3B:
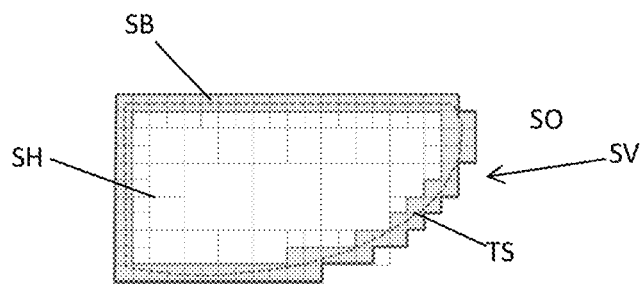

A main idea of the disclosure, illustrated on FIGS. 2A and 2B, is to partition the voxels of both the objects and the spaces (or zones) into two sets: "heart" (or "core") and "border" voxels. Border voxels intersect both the object or the space and the outer space, while heart voxels only intersect the object or space. It is worth noting that in some cases ("thin" objects and spaces), the set of heart voxels may be empty while the set of border voxels is not. The reciprocal case, instead, is not possible. It is possible that "logical" objects having no geometry, and therefore no voxel representation, are also present, but such a case is not really of concern.

The union of the set of border voxels and the set of heart voxels constitute an upper bound of the object or the space, respectively. The set of heart voxels, by itself, constitute a lower bound.

FIG. 2A represents the tessellated (high resolution) geometry TO of an object and its voxel approximation OV, which is decomposed into a set of heart object voxels OH and a set of border object voxels OB, surrounding the heart object voxels. Similarly, FIG. 2B represents the tessellated (high resolution) geometry TS of a space and its voxel approximation SV, which is decomposed into a set of heart space voxels SH and a set of border space voxels SB, surrounding the heart space voxels. FIG. 2B also represents the outer space SO, which is the complement (in the sense of set theory) of SV. The outer space SO may be decomposed into voxels or not.

Another main idea is to consider intersections between these sets of voxels. More particularly, determining the localization of object OV with respect to space SV requires evaluating six Boolean functions:

OH∩SH=1 if the set of heart object voxels intersects the third set of heart space voxels, 0 otherwise;
OH∩SB=1 if the set of heart object voxels intersects the set of border space voxels;
OH∩SO=1 if the set of heart object voxels extends outside the digitally-modeled space;
OB∩SH=1 if the set of border object voxels intersects the set of heart space voxels;
OB∩SB=1 if the set of border object voxels intersects the set of border space voxels; and
OB∩SO=1 if the set of border object voxels extends outside the digitally-modeled space.
Where "∩" is the symbol for intersection.

The first three Boolean functions allow identifying $2^3=8$ different categories representing the position of the object heart voxels with respect to the space:

H000: OH∩SH=0; OH∩SB=OH∩SO=0;
H100: OH∩SH=1; OH∩SB=0; OH∩SO=0;
H010: OH∩SH=0; OH∩SB=1; OH∩SO=0;
H001: OH∩SH=0; OH∩SB=0; OH∩SO=1;
H110: OH∩SH=1; OH∩SB=1; OH∩SO=0;
H011: OH∩SH=0; OH SB=1; OH∩SO=1;
H101: OH∩SH=1; OH∩SB=0; OH∩SO=1;
H111: OH∩SH=1; OH SB=1; OH∩SO=1;

The H000 category corresponds to "thin" objects, comprising no heart voxels but only border voxels.

In turn, the Boolean values taken by these three Boolean functions are used to evaluate three three-valued logic functions, which can take three values: "true" (or "yes"), "false" (or "no") and "indeterminate" (or "may be"). These functions are:

$OH_{in}$: is the set of heart object voxels inside the space?
$OH_{in/out}$: is the set of heart object voxels both inside and outside the space?
$OH_{out}$: is the set of heart object voxels outside the space?
This is illustrated on FIG. 3A.

The second three Boolean functions allow identifying $2^3=8$ different categories representing the position of the object border voxels with respect to the space:

B000: OB∩SH=0; OB∩SB=0; OB∩SO=0;
B100: OB∩SH=1; OB∩SB=0; OB∩SO=0;
B010: OB∩SH=0; OB∩SB=1; OB∩SO=0;
B001: OB∩SH=0; OB∩SB=0; OB∩SO=1;
B110: OB∩SH=1; OB∩SB=1; OB∩SO=0;
B011: OB∩SH=0; OB∩SB=1; OB∩SO=1;
B101: OB∩SH=1; OB∩SB=0; OB∩SO=1;
B111: OB∩SH=1; OB∩SB=1; OB∩SO=1;

The B000 category corresponds to objects which have no voxel representation, and therefore no position. Clearly, an object which belongs to the B000 category also belongs to H000, because an object with no border voxels cannot have heart voxels.

In turn, the Boolean values taken by these three Boolean functions are used to evaluate three additional three-valued logic functions, which can take three values: "true" (or "yes"), "false" (or "no") and "indeterminate" (or "may be"). These functions are:

$OB_{in}$: is the set of border object voxels inside the space?
$OB_{in/out}$: is the set of border object voxels both inside and outside the space?
$OB_{out}$: is the set of border object voxels outside the space? This is illustrated on FIG. 3B.

Figure 3C:
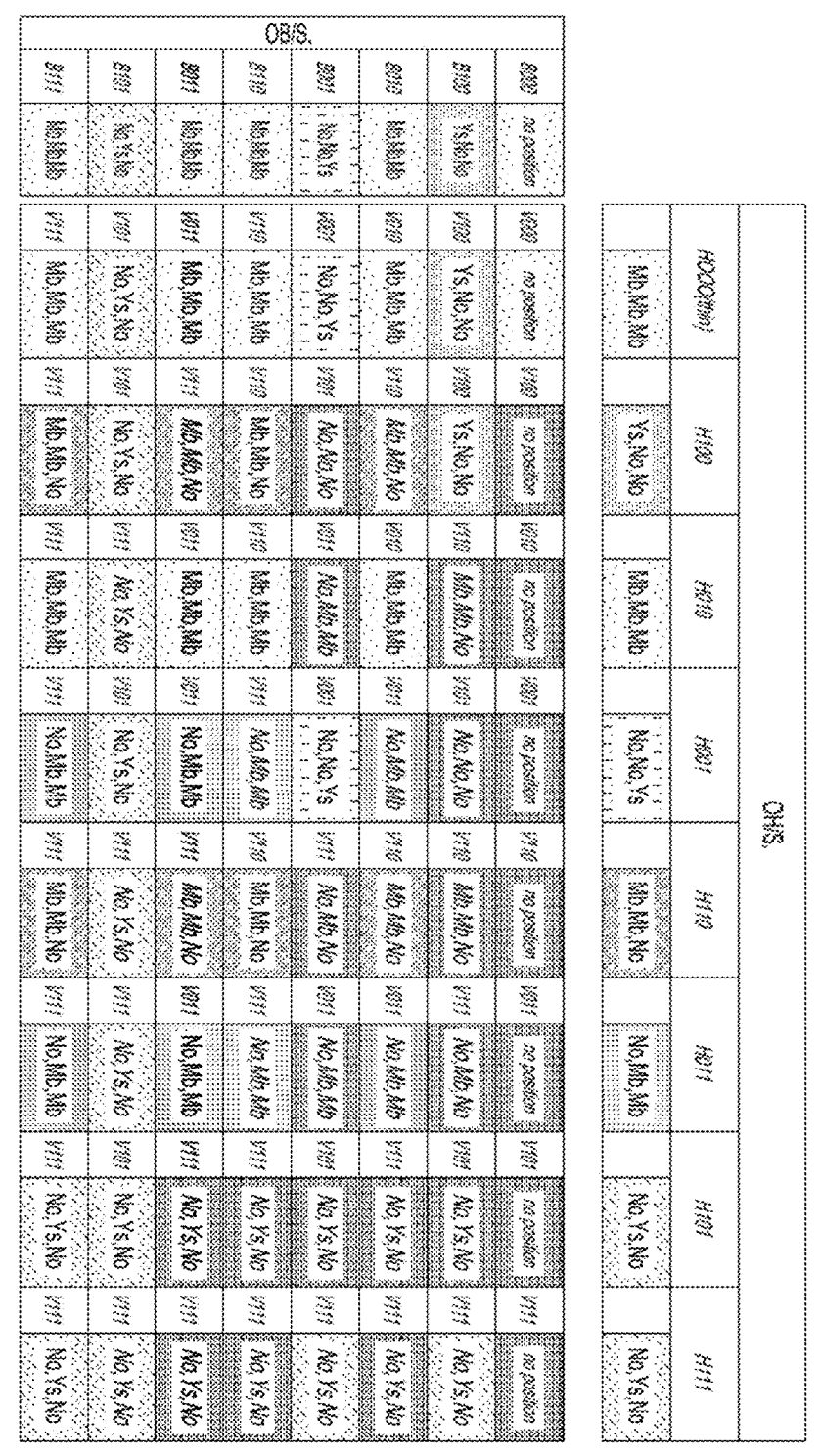

Overall, the six Boolean functions allow identifying $2^6=64$ conceivable cases (not all of which, however, are possible), which are represented on FIG. 3C. FIG. 3C is in the form of a two-entry table, whose entry are the "Bxyz" and "Hijk" categories (x, y, z, i, j, k taking 0 and 1 values). Each cell of the table correspond to one of the 64 conceivable cases, and can therefore be identified by the six binary values x, y, z, i, j, k. It is also interesting to define a third set of categories Vuvw (u, v, w=0, 1) which is defined as follows V000: (OB∪OH)∩SH=0; (OB∪OH)∩SB=0; (OB∪OH)∩SO=0;
V100: (OB∪OH)∩SH=1; (OB∪OH)∩SB=0; (OB∪OH)∩SO=0;
V010: (OB∪OH)∩SH=0; (OB∪OH)∩SB=1; (OB∪OH)∩SO=0;
V001: (OB∪OH)∩SH=0; (OB∪OH)∩SB=0; (OB∪OH)∩SO=1;
V110: (OB∪OH)∩SH=1; (OB∪OH)∩SB=1; (OB∪OH)∩SO=0;
V011: (OB∪OH)∩SH=0; (OB∪OH)∩SB=0; (OB∪OH)∩SO=0;
V101: (OB∪OH)∩SH=1; (OB∪OH)∩SB=0; (OB∪OH)∩SO=1;
V111: (OB∪OH)∩SH=1; (OB∪OH)∩SB=1; (OB∪OH)∩SO=1.

It can be noted that u=x OR i; v=y OR j; w=z OR k.

The six Boolean values x, y, z, i, j, k are used to evaluate three additional three-valued logic functions, which are the one actually used for determining the relationship between the digitally-modeled object with respect to the digitally-modeled space:

$O_{in}$: is the object fully inside the space?
$O_{acr}$: is the object across the space?
$O_{out}$: is the object fully outside the space?

Again, these logical functions can take three values: "true" (or "yes"), "false" (or "no") and "indeterminate" (or "may be"). On FIG. 3C, the values taken by $O_{in}$, $O_{acr}$, $O_{out}$—which are determined by considering each individual case—are written inside the cells of the table.

In principle, there are $3^3=27$ possible combinations for ($O_{in}$, $O_{acr}$, $O_{out}$), but it is easy to understand that the actual number is lower, because it is impossible that more than one function at a time take a "true" value. Indeed, each case (and therefore each cell of the table of FIG. 3C) falls in one of the following categories:

"Deeply In": ($O_{in}$=yes. $O_{acr}$=no, $O_{out}$=no). This corresponds to the (B100, H000) and the (B100, H100) cells.
"Border&In": ($O_{in}$=may be; $O_{acr}$ may be, $O_{out}$=no). This corresponds to the (B010, H100), (B010, H110), (B110, H100), (B110, H110), (B011, H100), (B011, H110), (B111, H100), (B111, H110) cells.
"Across": ($O_{in}$=no; $O_{acr}$=yes; $O_{out}$=no). This corresponds to the (B100, H111), (B001, H111), (B101, H000), (B101, H100), (B101, H010), (B101, H001), (B101, H110), (B101, H011), (B101, H101), (B101, H111), (B111, H101), (B111, H111) cells.
"Border&Out": ($O_{in}$=no; $O_{acr}$=may be, $O_{out}$=may be). This corresponds to the (B010, H001), (B010, H011), (B110, H001), (B1100, H011), (B011, H011), (B111, H001), (B111, H011) cells.
"Fully Out": ($O_{in}$=no. $O_{acr}$=no, $O_{out}$=yes). This corresponds to the (B001, H000), (B001, H001) cells.

"Border": ($O_{in}$=may be; $O_{acr}$=may be; $O_{out}$=may be)—i.e. situation where the position of the object cannot be determined. This corresponds to the (B010, H000), (B010, H010), (B110, H000), (B110, H010), (B011, H000), (B011, H010), (B111, H000), (B111, H010) cells. By convention, the (B000, H000) cell—which corresponds to an object without geometry and therefore without position—can also be considered to fall into the "Border" category.

All other cells correspond to impossible cases.

On FIG. 3C, each cell has an appearance (texture) corresponding to the category to which it belongs ("impossible" being assimilated to a ninth category). The values of $O_{in}$, $O_{acr}$, $O_{out}$ are written in italics for cells which corresponds to "limit" cases, which are highly unlikely to occur in real-word application, but can nevertheless be dealt with by the inventive method; for instance (B010, H001) corresponds to the case where the space has a "hole" inside it, which is filled by the object.

It is very interesting to note that for the 27 "nominal" cases (excluding the 23 impossible cases and the 14 "limit" ones), Vuvw=Bxyz. This means that, if "limit" cases are neglected, it is possible to only consider the position of border voxels, and therefore only assess the values of the x, y, z Boolean variable.

Figure 4A:
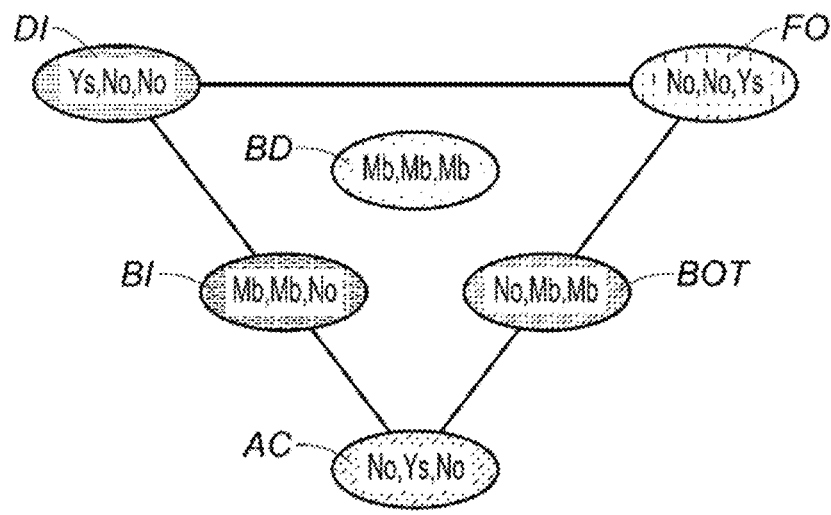
FIGS. 4A and 4B illustrate six different spatial relationships between objects and spaces which can be discriminated by a method according to an embodiment.
Figure 4B:
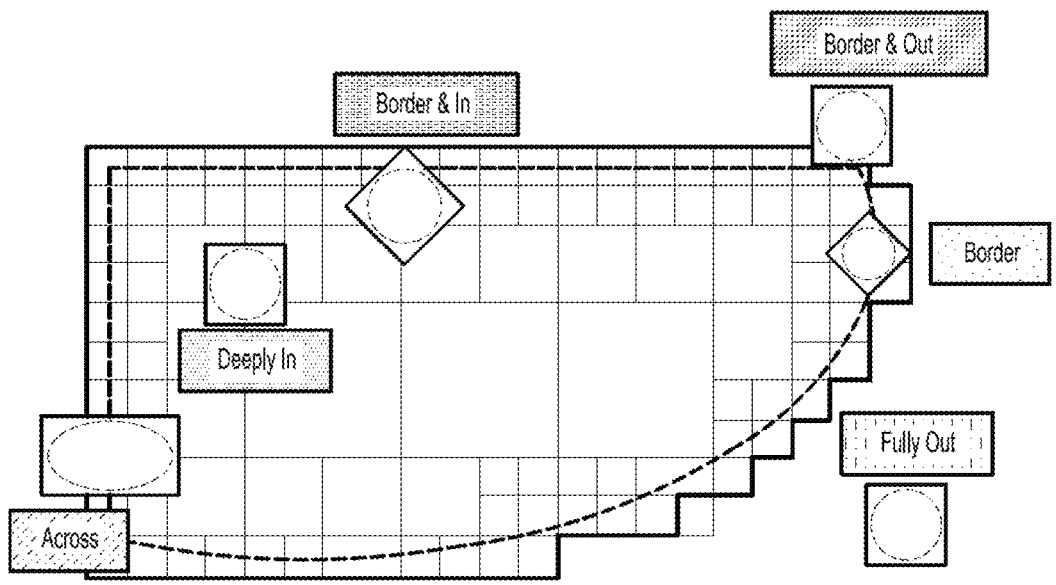

FIG. 4A represents the eight categories above, and can serve as a legend for interpreting FIG. 3C. FIG. 4B allows understanding the meaning of the different categories:

"Deeply In" objects only overlap with the heart voxels of the space.

"Border & In" objects overlap with both the heart and the border voxels of the space (which mean that they may, or may not, slightly extend outside the space);

"Across" objects overlap with the heart and the border voxels of the space, and with the outside space.

"Border In & Out" objects overlap with the border voxels of the space and the outside space, but not with the heart voxels of the space (which mean that they may, or may not, be partly situated inside the space).

"Fully Out" objects only overlap with the outside space.

"Border" objects only overlap with the border voxels of the space. It is impossible to know whether they are inside, outside or across the space, unless the spatial resolution of the voxel representation is increased.

Three-valued logical functions are useful for understanding the operation of the inventive method, but the attribution of objects to categories can be performed directly from the six Boolean function $OH_{in}$, $OH_{in/out}$, $OH_{out}$, $OB_{in}$, $OB_{in/out}$, $OB_{out}$. Moreover, different categories than those listed above could be used. For instance, it may be advantageous to define a "Partly In" category corresponding to the union of "Deeply In" and "Border&In" and a "Partly Out" category corresponding to the union of "Fully Out" and "Border&Out". The drawback would be that, in such a case, an object may belong to several categories. For this reason it is preferred to use the six categories above; the "Partly In" and "Partly Out" concept may nevertheless be used in volumetric queries, as it will be explained below in reference to FIG. 7.

Figure 5:
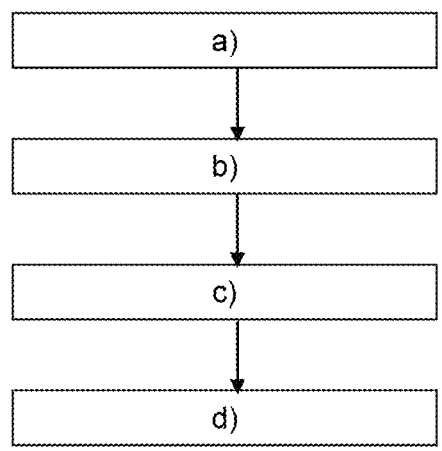
FIG. 5 is a flow-chart of a method of determining a localization of an object with respect to a space according to an embodiment.

FIG. 5 is a flow chart of a method of determining a localization of a digitally-modeled object with respect to a digitally-modeled space according to an embodiment. It comprises four steps a) to d).

Step a) comprising retrieving (e.g. from a database) or creating voxel representations of the digitally-modeled object and of the digitally-modeled space. This step may be performed by retrieving from a database a non-voxel-based (e.g. tessellated) representation of the object and of the space and by "voxelizing" them.

Step b) comprises partitioning the voxel representation of the digitally-modeled object into a first set of heart object voxels OH and a second set of border object voxels OB, and partitioning the voxel representation of the digitally-modeled space into a third set of heart space voxels SH and a fourth set of border space voxels SB. This step is illustrated by FIGS. 2A and 2B.

Step c) comprises evaluating the six Boolean functions $OH_{in}$, $OFl_{in/out}$, $OB_{out}$, $OB_{in}$, $OB_{in/out}$, $OB_{out}$ starting from the voxel-based representations of the object and the space.

Step d) comprises determining the localization of the digitally-modeled object with respect to the digitally-modeled space i.e. the category to which the object belongs ("Deeply In", "Border&In", "Across", "Border&Out", "Fully Out", "Border"). This step may be carried out using the table of FIG. 3C.

Figure 6:
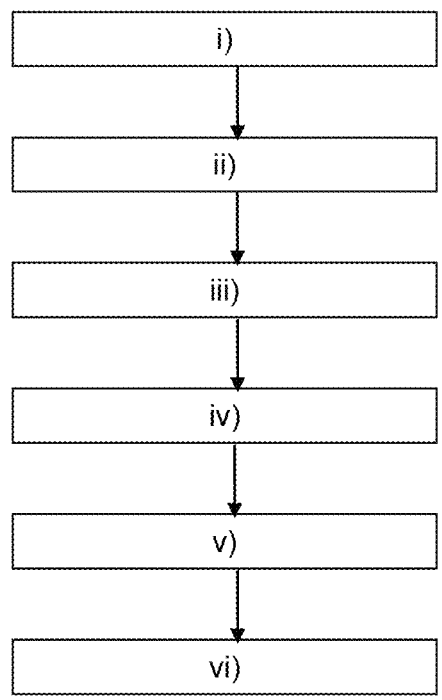
FIG. 6 is a flow-chart of a method of volumetric query according to another embodiment.

FIG. 6 is a flow chart of a method of performing a volumetric query according to an embodiment. It comprises 6 steps i) to vi).

Step i) comprises or creating voxel representations of a plurality of digitally-modeled objects and of one or more digitally-modeled space. Basically, it corresponds to step a) of the method of FIG. 5, but it is usually carried out for all (or a subset of) the spaces and objects of a digitally-modeled system (a digital mockup).

Step ii) comprises partitioning the voxel representation of each digitally-modeled objects into a first set of heart object voxels a second set of border object voxels, and partitioning the voxel representation of each or said digitally-modeled space into a third set of heart space voxels and a fourth set of border space voxels. Basically, it corresponds to step a) of the method of FIG. 5, but—as above—it is carried out for a plurality of objects and/or spaces.

Steps i) and ii) correspond to a "preparation" phase, which may be carried out "offline" in order to build an index of voxel-based representations. The following steps constitute the actual "query" phase, which is prompted by a request of the user and make use of the index.

Step iii) comprises receiving said request from the user, which comprises an indication the digitally-modeled space(s) and of a required relationship between the digitally-modeled space and objects to be retrieved. For instance, the user may be interested to find all the objects which are certainly inside the space.

Step iv) comprises evaluating the six Boolean functions $OH_{in}$, $OH_{in/out}$, $OH_{out}$, $OB_{in}$, $OB_{in/out}$, $OB_{out}$ starting from the voxel-based representations of the object and the space. Basically, it corresponds to step c) of the method of FIG. 5, but—as above—it is carried out for a plurality of objects and possibly spaces.

Step v) comprises, for each of said digitally-modeled object determining, based on the results of said assessing, if it matches the required spatial relationship with the digitally-modeled space. Basically, it corresponds to step d) of the method of FIG. 5, but—as above—it is carried out for a plurality of objects and possibly spaces.

Step vi) comprises retrieving the digitally-modeled objects matching the required spatial relationship with the digitally-modeled space, and providing them to the user in a suitable form (list, graphical representation, etc.).

Figure 7:
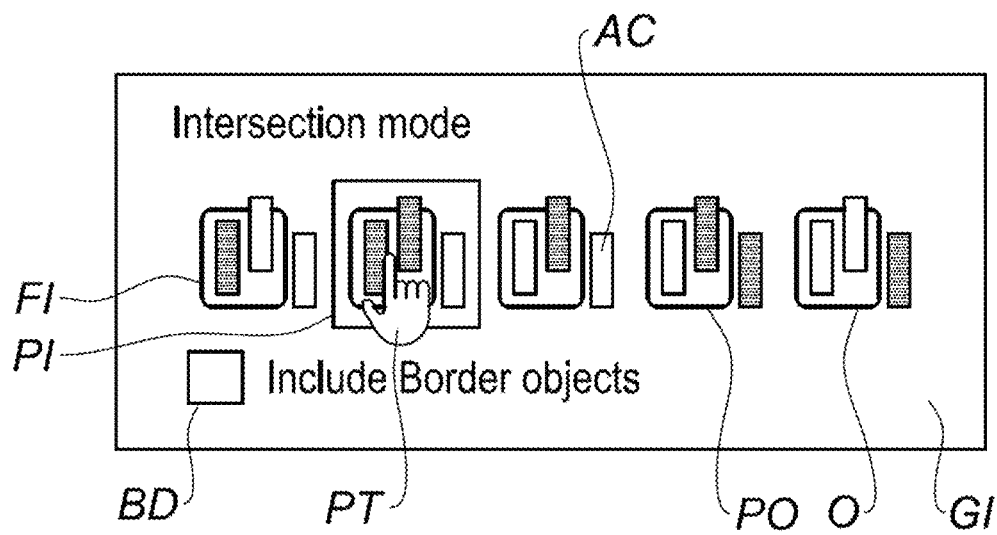
FIG. 7 represents a graphical interface for carrying out such a method.

FIG. 7 illustrates a graphical interface to carry out step iii) of the method of FIG. 6, i.e. to enter a query. A graphical interface GI appears or is activated after that a space has been selected; the interface comprises six icons and a checkbox; a pointer PT may be used to click on an icon and to check/uncheck the checkbox.

The icons correspond to different required spatial relationships, which do not all exactly coincide with the category of FIG. 4A (this, however, is only an example and different choices are possible). Icon FI (for "Fully In") launches a query for "Deeply In" objects. Icon PI (for "Partially In") launches a query for objects which are certainly at least partly inside the space, and therefore belong to either the "Deeply In" or the "Border&In" objects. Icon AC (for "Across") launches a query for objects belonging to the "Across" category of FIG. 4A. Icon PO (for "Partially Out") launches a query for objects which are certainly at least partly outside the space, and therefore belong to either the "Fully Out" or the "Border&Out" categories. Icon "O" (for "Outside") launches a query for "Fully Out" objects. When the checkbox BD (for "Border") is checked, "Border" objects are also retrieved, which ensures that no objects are missed.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 8:
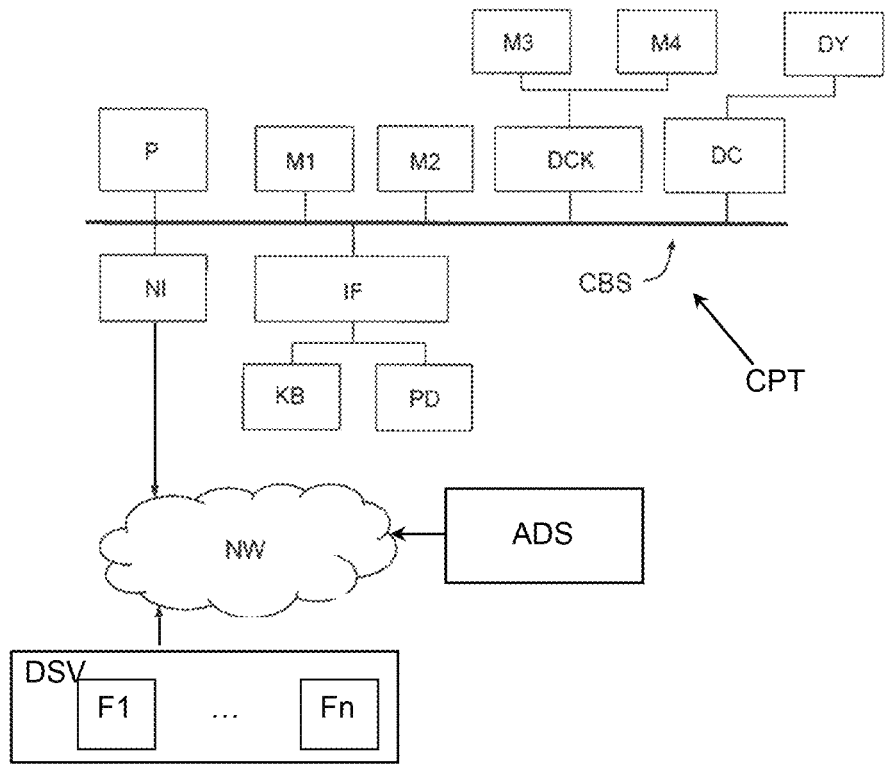
FIG. 8 is a block diagram of a computer system suitable for carrying out a method according to an embodiment.

A computer CPT suitable for carrying out a method according to an exemplary embodiment is described with reference to FIG. 8. In FIG. 8, the computer CPT includes a Central Processing Unit (CPU) P which performs the method step described above while running an executable program, i.e. a set of computer-readable instructions, stored in a memory device such as RAM M1 or ROM M2 or hard disk drive (HDD) M3, DVD/CD drive M4, or stored remotely. Moreover, Moreover, one or more digital mockups and/or indexes constituted by pixel-based representations of objects and spaces of the mockup(s) may also be stored on one or more of memory devices M1 to M4, or remotely.

The claimed invention is not limited by the form of the computer-readable media on which the computer-readable instructions and/or the data structure of the inventive process are stored. For example, the instructions and files can be stored on CDs, DVDs, in FLASH memory, RAM, ROM, PROM, EPROM, EEPROM, hard disk or any other information processing device with which the computer communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with CPU P and an operating system such as Microsoft VISTA, Microsoft Windows 10, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer CPT in FIG. 8 also includes a network interface NI, such as an Intel Ethernet PRO network interface card from Intel Corporation of America, for interfacing with a network, such as a local area network (LAN), wide area network (WAN), the Internet and the like. The computer further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD (e.g. driving the pointe PT of FIG. 7), such as a roller ball, mouse, touchpad and the like. The display, the keyboard and the pointing device, together with the display controller and the I/O interfaces, form a graphical user interface, used by the user to provide input commands and by the computer e.g. for launching volumetric queries as illustrated on FIG. 7.

Disk controller DKC connects HDD M3 and DVD/CD M4 with communication bus CBS, which can be an ISA, EISA, VESA, PCI, or similar, for interconnecting all of the components of the computer.

A description of the general features and functionality of the display, keyboard, pointing device, as well as the display controller, disk controller, network interface and I/O interface is omitted herein for brevity as these features are known.

Network interface NI connects computer CPT to a system administrator ADS and to one or more data servers DSV storing files F1, F2 containing data describing objects and spaces. For instance, the server may store files forming a digital mockup, and files forming an index (voxel-based representation of the spaces and objects of the mockup, partitioned into "heart" and "border" voxels). In this case, the data server stores and runs software for creating the index (cf. steps i) and ii) of the method of FIG. 6) while computer CPT stores and runs software for performing volumetric queries (cf. steps iii) to vi) of the method of FIG. 6).

Network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

Any method steps described herein should be understood as representing modules, segments, or portions of code which include one or more executable instructions for implementing specific logical functions or steps in the process, and alternate implementations are included within the scope of the exemplary embodiment.

The invention claimed is:

1. A computer-implemented method of determining a localization of a digitally-modeled object with respect to a digitally-modeled space, comprising:

retrieving or creating voxel representations of the digitally-modeled object and of the digitally-modeled space;

partitioning a voxel representation of the digitally-modeled object into a first set of heart object voxels that only intersect the object and a second set of border object voxels that intersect both the object and an outer space and partitioning a voxel representation of the digitally-modeled space into a third set of heart space voxels that only intersect the space and a fourth set of border space voxels that intersect both the space and the outer space;

assessing whether:
the second set of border object voxels intersects the third set of heart space voxels,
the second set of border object voxels intersects the fourth set of border space voxels, and
the second set of border object voxels extends outside the digitally-modeled space; and based on results of said assessing, determining localization of the digitally-modeled object with respect to the digitally-modeled space.

2. The method of claim 1, wherein the assessing further comprises assessing whether:
the first set of heart object voxels intersects the third set of heart space voxels,
the first set of heart object voxels intersects the fourth set of border space voxels, and
the first set of heart object voxels extends outside the digitally-modeled space.

3. The method of claim 1, wherein the determining further comprises:
evaluating a first three-valued logic function of results of said assessing, representing whether the digitally-modeled object is fully inside the digitally-modeled space,
evaluating a second three-valued logic function of the results of said assessing, representing whether the digitally-modeled object is situated across a border of the digitally-modeled space, and
evaluating a third three-valued logic function of the results of said assessing, representing whether the digitally-modeled object is fully outside the digitally-modeled space,
wherein each of said three-valued logic functions take a 'true' value, a 'false' value, or an 'indeterminate' value.

4. The method of claim 3, wherein the determining further comprises assigning the digitally-modeled object to one of a plurality of classes depending on values of said three-valued logic functions.

5. The method of claim 4, wherein said classes include:
a first class of digitally-modeled objects for which the first three-valued logic function takes a 'true' value, and the second and third three-valued logic functions take a 'false' value,
a second class of digitally-modeled objects for which the first and the second three-valued logic functions take an 'indeterminate' value and the third three-valued logic function takes a 'false' value,
a third class of digitally-modeled objects for which the first and the third three-valued logic functions take a 'false' value and the second three-valued logic function takes a 'true' value,
a fourth class of digitally-modeled objects for which the first three-valued logic function takes a 'false' value and the second and the third three-valued logic functions takes an 'indeterminate' value,
a fifth class of digitally-modeled objects for which the first and the second three-valued logic functions take a 'false' value and the third three-valued logic function takes a 'true' value, and
a sixth class of digitally-modeled objects for which the three three-valued logic functions all take an indeterminate value.

6. The method of claim 1, wherein said voxel representations are n-tree, including octree, voxel representations.

7. The method of claim 1, wherein the retrieving or creating includes creating the voxel representation of at least one of the digitally-modeled object and digitally-modeled space from a different representation thereof.

8. A non-transitory computer-readable data-storage medium having stored thereon computer-executable instructions to cause a computer system to carry out the method according to claim 1.

9. A computer-implemented method of performing a volumetric query, comprising:
a first phase, including:
retrieving or creating voxel representations of a plurality of digitally-modeled objects and of one or more digitally-modeled spaces;
partitioning a voxel representation of each digitally-modeled object into a first set of heart object voxels that only intersect the object and a second set of border object voxels that intersect both the object and an outer space, and partitioning a voxel representation of each of said digitally-modeled spaces into a third set of heart space voxels that only intersect the space and a fourth set of border space voxels that intersect both the space and the outer space;
a second phase, including:
receiving a request from a user, the request including an indication of said one or more digitally-modeled spaces and an indication of a required relationship between the one or more digitally-modeled spaces and objects to be retrieved;
for each of said digitally-modeled objects assessing whether:
a second subset of border object voxels intersects the third set of heart space voxels, and
the second subset of border object voxels intersects the fourth set of border space voxels;
for each of said digitally-modeled objects, determining, based on results of said assessing, if the respective digitally-modeled object matches a required spatial relationship with the one or more digitally-modeled spaces; and
retrieving the digitally-modeled objects matching the required spatial relationship with the one or more digitally-modeled spaces.

10. The method of claim 9, wherein the retrieving further comprises:
assessing whether:
a first subset of heart object voxels intersects the third set of heart space voxels,
the first subset of heart object voxels intersects the fourth set of border space voxels, and
the first subset of heart object voxels extends outside the one or more digitally-modeled spaces.

11. The method of claim 9, wherein the determining if the respective digitally-modeled object matches a required spatial relationship further comprises, for each of said digitally-modeled objects:
evaluating a first three-valued logic function of the results of said assessing, representing whether the respective digitally-modeled object is at least partially inside the one or more digitally-modeled spaces,
evaluating a second three-valued logic function of the results of said assessing, representing whether the respective digitally-modeled object is at least partially situated across the border of the one or more digitally-modeled spaces, and
evaluating a third three-valued logic function of the results of said assessing, representing whether the respective digitally-modeled object is at least partially outside the one or more digitally-modeled spaces, and wherein each of said three-valued logic functions take a 'true' value, a 'false' value, or an 'indeterminate' value.

12. The method of claim 11, wherein the required spatial relationship between the one or more digitally-modeled spaces and objects to be retrieved is chosen among:
digitally-modeled objects which are certainly fully inside the one or more digitally-modeled spaces,
digitally-modeled objects which are certainly at least partly inside the one or more digitally-modeled spaces,
digitally-modeled objects which are certainly across a border of the one or more digitally-modeled spaces,
digitally-modeled objects which are certainly at least partly outside the one or more digitally-modeled spaces,
digitally-modeled objects which are certainly fully outside the one or more digitally-modeled spaces s, and
digitally-modeled objects whose relationship with the one or more digitally-modeled spaces is undetermined.

13. The method of claim 12, wherein, the determining if the respective digitally-modeled object matches a required spatial relationship further includes
considering objects for which the first three-valued logic function takes a 'true' value, and the second and third three-valued logic functions take a 'false' value to be certainly fully inside the one or more digitally-modelled spaces;
considering objects for which the first and the second three-valued logic functions take an 'indeterminate' value and the third three-valued logic function takes a 'false' value, as well as objects for which the first three-valued logic function takes a 'true' value, and the second and third three-valued logic functions take a 'false' value are considered to be certainly fully inside the one or more digitally-modelled spaces, to be certainly at least partly inside the one or more digitally-modelled spaces;
considering objects for which the first and the third three-valued logic functions take a 'false' value and the second three-valued logic function takes a 'true' value to be certainly across the border of the one or more digitally-modelled spaces;
considering objects for which the first and the second three-valued logic functions take a 'false' value and the third three-valued logic function takes a 'true' value to be certainly fully outside the one or more digitally-modelled spaces;
considering objects for which the first three-valued logic function takes a 'false' value and the second and the third three-valued logic functions takes an 'indeterminate' value, as well as objects for which the first and the second three-valued logic functions take a 'false' value and the third three-valued logic function takes a 'true' value, to be certainly at least partly outside the one or more digitally-modelled spaces; and
considering objects for which the three three-valued logic functions all take a false value to have an undetermined relationship with the one or more digitally-modelled spaces.

14. The method of claim 9, wherein said voxel representations are n-tree, including octree, voxel representations.

15. The method of claim 9, wherein the retrieving or creating the voxel representations further comprises creating the voxel representation of at least one of the digitally-modeled object and digitally-modeled space from a different representation thereof.

16. A non-transitory computer-readable data-storage medium having stored thereon computer-executable instructions to cause a computer system to carry out the method according to claim 9.

17. A computer system comprising:
a processor coupled to a non-transitory memory and a graphical user interface, the non-transitory memory storing computer-executable instructions for determining a localization of a digitally-modeled object with respect to a digitally-modeled space that when executed by the processor cause the processor to be configured to:
retrieve or create voxel representations of the digitally-modeled object and of the digitally-modeled space,
partition a voxel representation of the digitally-modeled object into a first set of heart object voxels that only intersect the object and a second set of border object voxels that intersect both the object and an outer space and partition a voxel representation of the digitally-modeled space into a third set of heart space voxels that only intersect the space and a fourth set of border space voxels that intersect both the space and the outer space,
assess whether:
the second set of border object voxels intersects the third set of heart space voxels,
the second set of border object voxels intersects the fourth set of border space voxels, and
the second set of border object voxels extends outside the digitally-modeled space, and
based on results of said assessing, determine localization of the digitally-modeled object with respect to the digitally-modeled space.

* * * * *